(12) United States Patent
Bianchi et al.

(10) Patent No.: US 9,744,942 B2
(45) Date of Patent: Aug. 29, 2017

(54) DOUBLE-SECURITY ANTI-THEFT EMERGENCY DEVICE FOR BATTERYLESS MOTOR VEHICLES

(71) Applicant: Betamotor S.P.A., Rignano sull'Arno (IT)

(72) Inventors: Lapo Bianchi, Florence (IT); Jacopo Fiaschi, Scandicci (IT)

(73) Assignee: Betamotor S.P.A., Rignano sull'Arno (FI) (IT)

( * ) Notice: Subject to any disclaimer, the term of this patent is extended or adjusted under 35 U.S.C. 154(b) by 8 days.

(21) Appl. No.: 15/061,825

(22) Filed: Mar. 4, 2016

(65) Prior Publication Data

US 2016/0257286 A1    Sep. 8, 2016

(30) Foreign Application Priority Data

Mar. 5, 2015   (IT) ................ FI2015A0060

(51) Int. Cl.
| | |
|---|---|
| *B60R 25/00* | (2013.01) |
| *B60R 21/00* | (2006.01) |
| *B60R 25/04* | (2013.01) |
| *B60R 25/24* | (2013.01) |
| *G06K 7/10* | (2006.01) |

(52) U.S. Cl.
CPC ............. *B60R 25/04* (2013.01); *B60R 25/24* (2013.01); *G06K 7/10415* (2013.01); *B60R 2325/105* (2013.01); *B60R 2325/306* (2013.01)

(58) Field of Classification Search
CPC ... B60R 25/04; B60R 25/24; B60R 2325/306; B60R 2325/105; G06K 7/10415
See application file for complete search history.

(56) References Cited

U.S. PATENT DOCUMENTS

| | | | | |
|---|---|---|---|---|
| 6,531,964 | B1* | 3/2003 | Loving | G06K 7/10881 340/10.1 |
| 2007/0057790 | A1* | 3/2007 | Alden | G06F 3/0202 340/572.1 |
| 2009/0108989 | A1* | 4/2009 | Sinclair | B60R 25/045 340/5.62 |
| 2010/0328043 | A1* | 12/2010 | Jantunen | G06K 7/0008 340/10.3 |
| 2014/0091903 | A1* | 4/2014 | Birkel | B60R 25/24 340/5.54 |
| 2016/0371907 | A1* | 12/2016 | Ma | E05B 81/80 |

* cited by examiner

*Primary Examiner* — Mary Cheung
(74) *Attorney, Agent, or Firm* — Nancy J. Flint, Esq.; Nancy J. Flint, Attorney At Law, P.A.

(57) ABSTRACT

A double-security anti-theft emergency switch, specially suitable for batteryless race motor vehicles comprising a fixed assembly integral with the vehicle and cooperating with a movable key which is tied up to the driver by means of an even partially elastic lace, is disclosed. The double security is bound to the presence of a first normally closed switch whose opening, via the movable key, is necessary to disconnect the ignition circuit of the motorcycle from ground and to allow the engine to start-up, so as to produce the electrical power necessary for an RFID system to monitor a transponder comprised in the movable key. Should the outcome of this transponder test be unsuccessful, a second normally open switch would be closed and would ground the ignition circuit of the engine and lock the motorcycle.

9 Claims, 2 Drawing Sheets

DOUBLE-SECURITY ANTI-THEFT EMERGENCY DEVICE FOR BATTERYLESS MOTOR VEHICLES

TECHNICAL FIELD

The present invention refers to the field of emergency stop switches for motor vehicles, used to stop the engine under emergency conditions, for instance falls or the like.

The specific features of the present device also make it a valuable system for preventing an unauthorized use of the vehicle.

Specifically, this invention is also applicable to batteryless vehicles that cannot use electrical power to identify the driver before starting up the engine, for instance to kick-start motorcycles.

PRESENT STATUS OF THE ART

Vehicles, in particular race motor vehicles, can reach dangerous operating conditions, especially if the engine does not stop when the driver loses the control of the vehicle, as in the case of falls; for this reason numerous engine emergency stop devices have been developed and these, in some races, are mandatory by regulation.

In modern engines the ignition of the air-gasoline mixture is generally controlled by an electronic control unit which can be provided with at least one input that, if grounded, causes the engine to switch off.

Some motor vehicles are provided with an emergency stop button which operates an on-off switch which closes a circuit which grounds this input.

Since, in the case of an accident, the driver is not always in a position to press a button, there is a wide use emergency stop switches formed of two elements which can disconnect from each other in the case of a driver's fall, a first element is integral with the vehicle and a second element, disconnectable from the former, is associated with a third element integral with the driver; said stop switches switch the engine off in the case that the disconnectable element gets away from the vehicle.

In a particularly convenient solution the disconnectable element comprises a magnet that usually holds the circuit to the electronic control unit open by overcoming the resistance of a spring; should said disconnectable element be removed, the magnetic element does not counter the spring any longer and the circuit closes, thus sending an engine switch off signal to the electronic control unit.

In modern controlled-ignition engines equipped with electronically controlled fuel injection apparatuses, a failure in the electrical power supply, besides preventing the operation of the sparking plug, also blocks injection.

This is the reason why solutions are frequently used whereby, in order to be able to use a motorcycle, it is necessary to functionally couple a magnetic key with a specific device, integral with the motorcycle. These solutions also operate as a rudimentary anti-theft device because it is not possible to start up the motor vehicle without using the magnetic key; however, this is a very weak anti-theft device because the magnetic key is usually the same for all emergency stop switching devices of the same model.

Therefore, in the sector of race motorcycles, which are not provided with any steering lock nor mechanical key, there is a very real need for equipping the motor vehicle not only with an emergency stop switch, but also with an anti-theft device that makes its use possible to the authorized driver only.

For this latter purpose a variety of automatic identification systems, capable of identifying appropriate identification elements, are used for some decades.

In particular, in the last years there has been a strong development in the use of radiofrequency identification systems, also referred to with the English acronym RFID, which allow to use electronic recognition labels, also called tags or transponders, which can be queried by appropriate reading apparatuses. Tags can be classified into active or passive, depending on how they receive power. The passive ones, which do not need any battery, are widely used.

As illustrated in patent application WO2007120635 A2, an authorization system based on the use of a transponder can also be used as an emergency stop switch.

However, the use of automatic identification systems is particularly complex in batteryless vehicles, because RFID systems usually need a power supply voltage rather constant for all the duration of the identification operation.

These problems are coped with by patent applications FR 2752549 A1 and EP 1067028 A2, dealing with anti-theft systems only.

Specifically, FR 2752549 A1 describes a motor vehicle provided with an electric generator driven by a kick-start engine, which obviates the limited power available immediately after start-up by using a particularly fast identification system, which operates thanks to an active tag; however, the latter shall receive power from an independent battery.

Conversely, EP 1067028 A2, with a special reference to the second embodiment shown in FIG. 2, highlights that system effectiveness can be guaranteed if the tag identification system becomes active after the normal engine start-up only, in that it receives power from an electric generator operated by the engine itself. Disadvantageously, the latter can be freely started up, even by unauthorized users, before the anti-theft system becomes effective.

Furthermore also recent devices, which take advantage of the presence of a magnet to start a transponder query, do not solve the problem of allowing a vehicle to start-up without the need for a back-up electrical power and simultaneously guaranteeing a safe start-up, besides an emergency stop.

For instance, patent application EP 2123521 describes a wristband provided with a magnet whose movement is perceived by a sensor integral with the vehicle and, only in the presence of a magnetic field, the authentication system activates the sending of a radiofrequency signal for the recognition of the tag present on the wristband.

In addition, no movable keys nor fixed assemblies of emergency stop and anti-theft switches are known configured in such a way as to perform at the best the functions that take place under different operating conditions. As a matter of fact, the movable key shall guarantee a fully effective identification while a vehicle is moving, in order not to run the risk of wrongly stopping the vehicle, even in the case of jumps or sudden changes of direction, and simultaneously it shall be easily wearable by the driver.

OBJECTS AND SUMMARY OF THE INVENTION

A first object of the anti-theft emergency stop switch according to the present patent application is to guarantee an emergency switch off of the vehicle, even without a voluntary intervention by the driver, should the latter be thrown from the saddle, while guaranteeing the identification of the driver of the vehicle, even if the latter is not equipped with a battery or any other back-up power supply system.

A further object of the present invention is to implement an economical and easy-to-install device that is reliable in all circumstances that might occur in using a motorcycle.

Another object yet of the present invention is to provide a device that is easy to inspect and wherein the presence, or not, of the element necessary for start-up and driver identification is clearly checkable.

Finally a further object of the present invention is to implement a system that allows to put a movable tag in proximity of the antenna of the RFID device, thus minimizing or fully zeroing the risk of malfunctions of the device or of cloning thereof, if any.

This object and others are obtained thanks to a surprising integration of elements in one emergency device also performing a double security anti-theft function.

The special construction of the system described below makes it possible to check the identity of the user since its start-up besides allowing a subsequent continuous and reliable monitoring of the presence of a driver aboard the motorcycle; all of this by using a movable key that is compact, easy to use, and economical to implement.

Said movable key interacts with a fixed assembly, integral with the vehicle, which comprises two switches, each of which, if closed, grounds the ignition of the engine, thus determining its switch-off. The grounding of the ignition of the engine can take place directly or it can take place by grounding an input of the electronic control unit provided for this purpose, which in those motorcycles which are provided therewith makes the latter switch off the engine.

A first switch can be operated in different manners, also by a contact or proximity element, whereas the second is controlled by a tag or transponder RFID identification system.

In a particularly simple and practical solution, the first switch is of the REED type, operated by a magnet getting closer thereto.

The movable key comprises both said transponder and means used to operate said first switch.

Furthermore, the movable key comprises engagement means which hold it in proximity of the fixed assembly during all activities of the motorcycle, even during sharp competitions; at the same time said engagement means are in any way calibrated so as to allow the extraction of the movable device in the case of a driver's fall or similar accidents.

The engagement means can be of different kinds, but the main ones are of a mechanical and/or magnetic type, in the latter case other magnets are present in the movable key in addition to that necessary to activate the REED switch. So the key engages the fixed assembly thanks to said one or several magnets and, should it be the case, thanks to a special configuration which increases the force necessary for disconnection.

In an essential embodiment the movable key comprises at least one magnet, cooperating with a REED switch present in the fixed assembly, and one transponder whose authentication information is checked by a radiofrequency identification system present in the fixed assembly.

The configuration of the invention is such that said transponder can be of a passive type, thus eliminating any need for equipping the movable key with electrical power supply systems; however, in principle, it is possible to also use non passive transponders, by supplying power thereto via power sources attached to the movable key or via the fixed assembly by means of appropriate power transfer systems, for instance contacts or the like.

Advantageously is the REED switch of a normally closed type so as to prevent the engine from starting-up in the absence of the magnet contained in the movable key. Conversely, the second switch, controlled by the identification system, is normally open so as to allow to switch on the engine when the identification system does not receive power.

In a particularly efficient embodiment the second switch is usually a solid state relay which is controlled by the signal emitted by a microcontroller communicating with the RFID system. The microcontroller usually receives power from a voltage regulator which guarantees the appropriate values for the electrical power supply, to reach which the engine shall have been started-up for at least some seconds.

After start-up, authorized by the REED switch, as soon as the voltage regulator correctly supplies power to the microcontroller and to the RFID identification system, a transponder test process is started. If the latter is not recognized, then the microcontroller causes the second switch to be grounded and consequently the engine to be switched off.

In any moment, even during the initialization of the transponder test which might need some seconds, should the movable key be removed, the REED switch operates and closes the circuit that grounds the ignition of the engine.

During the normal operation of the vehicle, the devices being redundant and their different principles of operation impart security to the emergency stop switch.

In a preferred implementation the fixed assembly is integral with the handlebar and the movable key is connected to the wrist of the driver via an even partially elastic lace.

In a particularly advantageous embodiment, the movable key features a ridge which engages a corresponding cavity present in the fixed assembly. In addition, should the container of the fixed assembly be amagnetic, at least one element made from a ferromagnetic material is incorporated internally thereto or is placed below.

Figure 1:
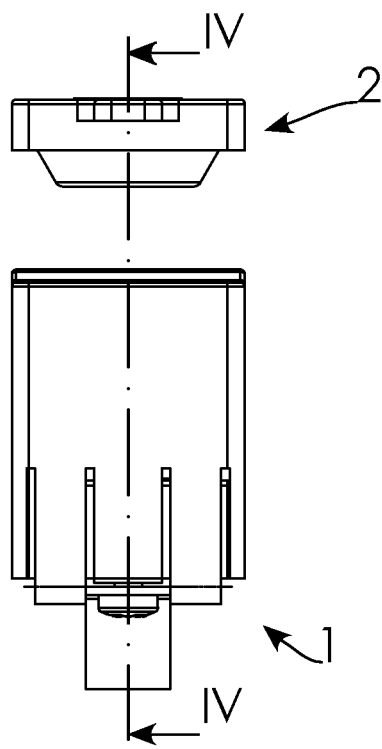
FIG. 1 shows a side view of a preferred embodiment of the anti-theft emergency device according to the present patent application; the figure shows a fixed assembly (1), in this case made integral with the handlebar of a motorcycle, and a movable key (2). The figure shows the trace of the cross-section plane according to FIG. 4 below.
Figure 2:
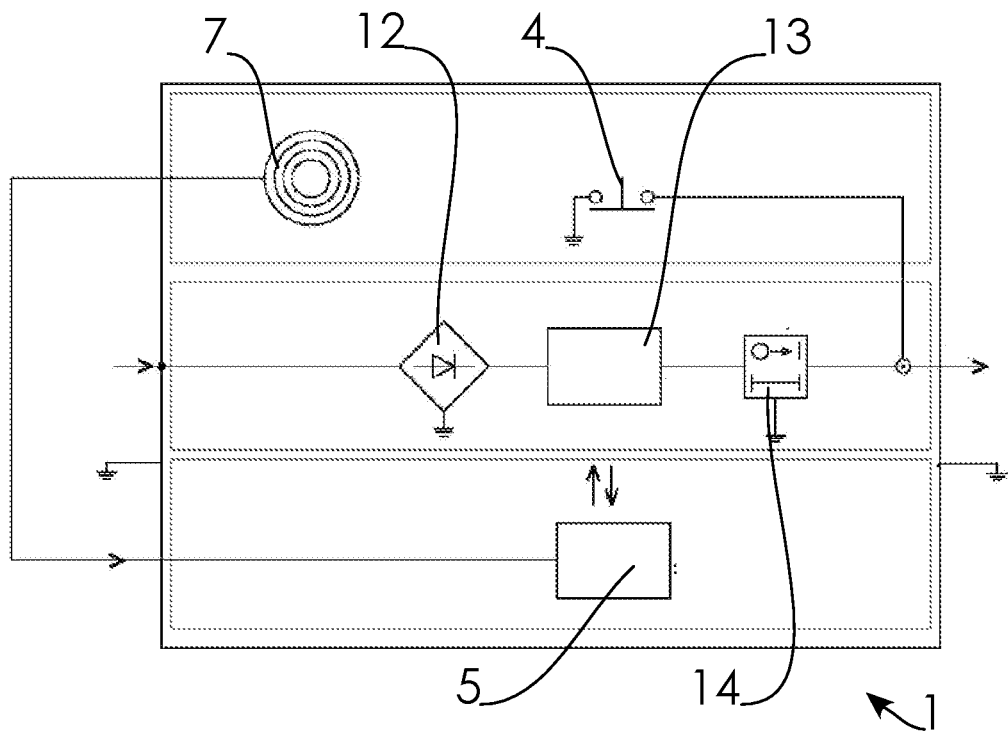
FIG. 2 shows a functional diagram of the fixed assembly (1) inside which there are visible an antenna (7) of an RFID system connected to an identification module (5) which exchanges data with a microcontroller (13), which receives power from the engine via a voltage regulator (12); the microcontroller (13) controls a relay (14) capable of grounding the ignition of the engine should the tag not be identified; a REED switch (4), also capable of grounding the ignition of the engine if not kept open by the magnet contained in the movable key, is also visible.
Figures 3, 4:
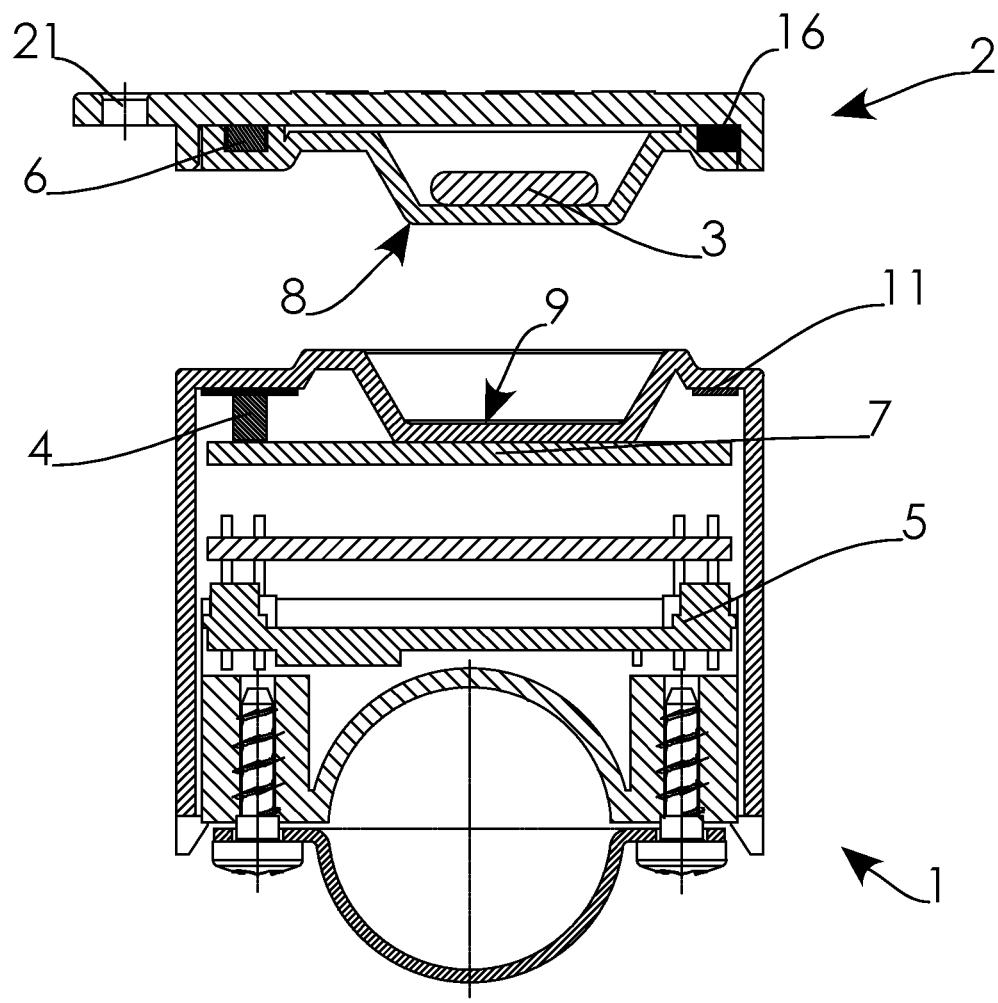
FIG. 3 shows a top view of the movable key (2) which allows to appreciate the ease of use and displacement of the object, besides an eye (21) for its connection to the driver.
FIG. 4 shows a cross-sectional view of FIG. 1 where it is possible to look at the main elements that make-up the fixed assembly (1) and the movable key (2). Specifically, the latter includes an eye (21) for its connection to an at least partially elastic thread-like element, not shown, and comprises a transponder (3) and a magnet (6) which opens the REED switch.

Inside the fixed assembly a radiofrequency module (5) of the RFID system and the antenna (7) are also visible.

Holding the movable key (2) engaged with the fixed assembly (1) is fostered by the presence in the key (2) of at least one magnet (16) and mechanical engagement means, including for instance a ridge (8) which mates a corresponding cavity (9) of the fixed assembly (1). In the embodiment shown in the figure the case of the fixed assembly (1) is made from an amagnetic material, hence the engagement force of said at least one magnet (16) develops thanks to presence of at least one corresponding ferromagnetic element (11).

DETAILED DESCRIPTION OF AN EMBODIMENT OF THE INVENTION

A preferred embodiment of the anti-theft emergency device according to the present patent application comprises a fixed assembly (1) made integral with the frame via connection means of a known type and a movable key (2) which can be connected to the driver of the motor vehicle via an eye (21) and an at least partially elastic lace.

In particular the fixed assembly (1) comprises a normally closed switch (4), whose closure grounds the ignition circuit of the engine, and an RFID system, which receives electric power from the operation of the engine, which monitors a transponder (3) contained in the movable key and grounds the ignition circuit of the engine should the transponder not be identified.

The movable key also comprises means for opening said switch (4), the latter can be of different types, even an electromechanical switch or a proximity switch, but in a preferred embodiment of the invention it consists of a REED switch and consequently the means for opening it, integral with said movable key (2), include a magnet (6); the REED switch opening allows to start-up and operate the engine which generates the electric power necessary to supply power to the RFID system and to test the transponder (3).

The RFID system usually receives power from a voltage regulator (12) which outputs the correct power values after a short period of time and consequently the RFID test is also performed after a short initial stabilization time.

In a preferred, but not mandatory, embodiment, the transponder (3) is of the passive type, thus making it unnecessary to equip the movable key (2) with power supply systems.

The RFID system comprises at least one module (5) which generates electromagnetic waves transmitted via an antenna (7); according to a practical and economical embodiment, the latter also receives the waves radiated back by said transponder (3) as a response and forwards them to said identification module (5) which processes them to check whether the transponder is actually that authorized.

In a particularly effective embodiment, internally to said fixed assembly (1) there is located a voltage regulator (12) which supplies power to a microcontroller (13) interfacing at least to the identification module (5) and to a relay (14), the latter capable of grounding the ignition of the engine whenever the transponder (3) is not identified.

The movable key (2) is usually connected to the driver via a string or, more in general, via a thread-like element which can be at least partially elastic. In the embodiment here illustrated the movable key (2) and the fixed assembly (1) include reciprocal engagement means of a mechanical or magnetic type, which contribute to prevent undesired disconnections of the movable key which would cause the engine to switch-off.

Advantageously can the fixed assembly (1) comprise a LED indicator receiving power from the same microcontroller.

In the preferred embodiment here described, the lower face of the movable key (2) also includes a ridge (8) which engages a respective cavity (9) in the fixed assembly (1).

In a preferred embodiment, the magnets are a plurality and, should the container of the fixed assembly (1) be made from an amagnetic material, it can internally comprise at least one element (11) made from a ferromagnetic material, for instance a small plate, which cooperates with the magnetic engagement means.

In the embodiment here described the transponder (3) is located inside the ridge of the movable key (2) so as to be located in proximity of the antenna, also thanks to the corresponding cavity present in the fixed assembly (1).

The features of the switch according to the present patent application make it possible for it to operate both from Direct Current (DC) and from Alternate Current (AC).

The invention claimed is:

1. An anti-theft emergency device for vehicles with non-motorized start-up and without electrical battery, comprising: a fixed assembly, integral with the vehicle and functionally cooperating with a movable key connectable to the driver's body, said fixed assembly and said movable key including reciprocal engagement means; said fixed assembly comprises an RFID system, receiving electrical power from the operation of the engine, and comprising at least one identification module which, via at least one antenna, exchanges electromagnetic waves with a transponder associated with said movable key, said identification module also monitors the waves radiated back by said transponder as a response, and grounds the ignition circuit of the engine whenever said transponder is not identified, characterized in that said fixed assembly comprises a normally closed REED switch, whose closing grounds the ignition circuit of the engine, and in that said movable key comprises at least one magnet to open said switch and this way to allow the operation of the engine which generates the electrical power necessary for the operation of said RFID system and to monitor said transponder.

2. An anti-theft emergency device according to claim 1, characterized in that said identification module receives power from a voltage regulator, which in turn supplies power to a microcontroller, the latter interfaces at least to said identification module and to a relay which is capable of grounding the ignition of the engine whenever said transponder is not identified.

3. An anti-theft emergency device according to claim 2, characterized in that said RFID system receives power from a voltage regulator which outputs the correct power values after a short period of time and consequently said monitoring takes place after a short period of time.

4. An anti-theft emergency device according to claim 1, characterized in that said transponder is of a passive type and said movable key does not receive electrical power.

5. An anti-theft emergency device according to claim 4, characterized in that said identification module receives power from a voltage regulator, which in turn supplies power to a microcontroller, the latter interfaces at least to said identification module and to a relay which is capable of grounding the ignition of the engine whenever said transponder is not identified.

6. An anti-theft emergency device according to claim 5, characterized in that said RFID system receives power from a voltage regulator which outputs the correct power values after a short period of time and consequently said monitoring takes place after a short period of time.

7. An anti-theft emergency device according to claim 1, characterized in that the reciprocal engagement means between said movable key and said fixed assembly are of a mechanical and/or magnetic type.

8. An anti-theft emergency device according to claim 1, characterized in that said movable key is connected to the driver via an at least partially elastic thread-like element.

9. An anti-theft emergency device according to claim 1, characterized in that said fixed assembly comprises a LED indicator device.

* * * * *